Sept. 14, 1954　　　　J. A. DERSCH　　　　2,689,035
CONVEYER AND STABILIZING DEVICE
Filed July 14, 1951　　　　　　　　　　　　5 Sheets-Sheet 1

INVENTOR.
John A. Dersch.
BY
Harness, Dickey & Pierce
ATTORNEYS.

Sept. 14, 1954 J. A. DERSCH 2,689,035
CONVEYER AND STABILIZING DEVICE
Filed July 14, 1951 5 Sheets-Sheet 3

INVENTOR.
John A. Dersch.
BY
Harness, Dickey & Pierce
ATTORNEYS.

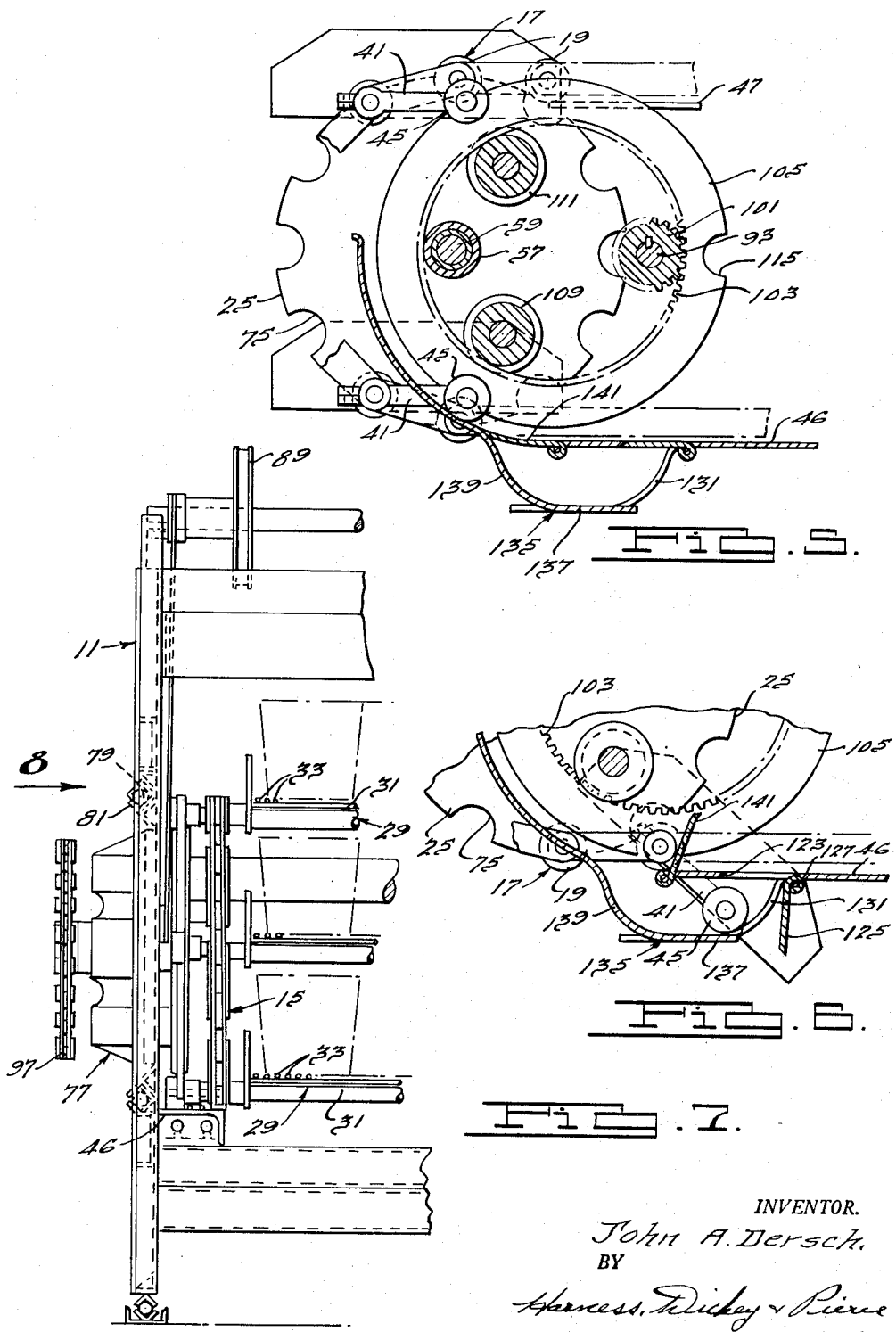

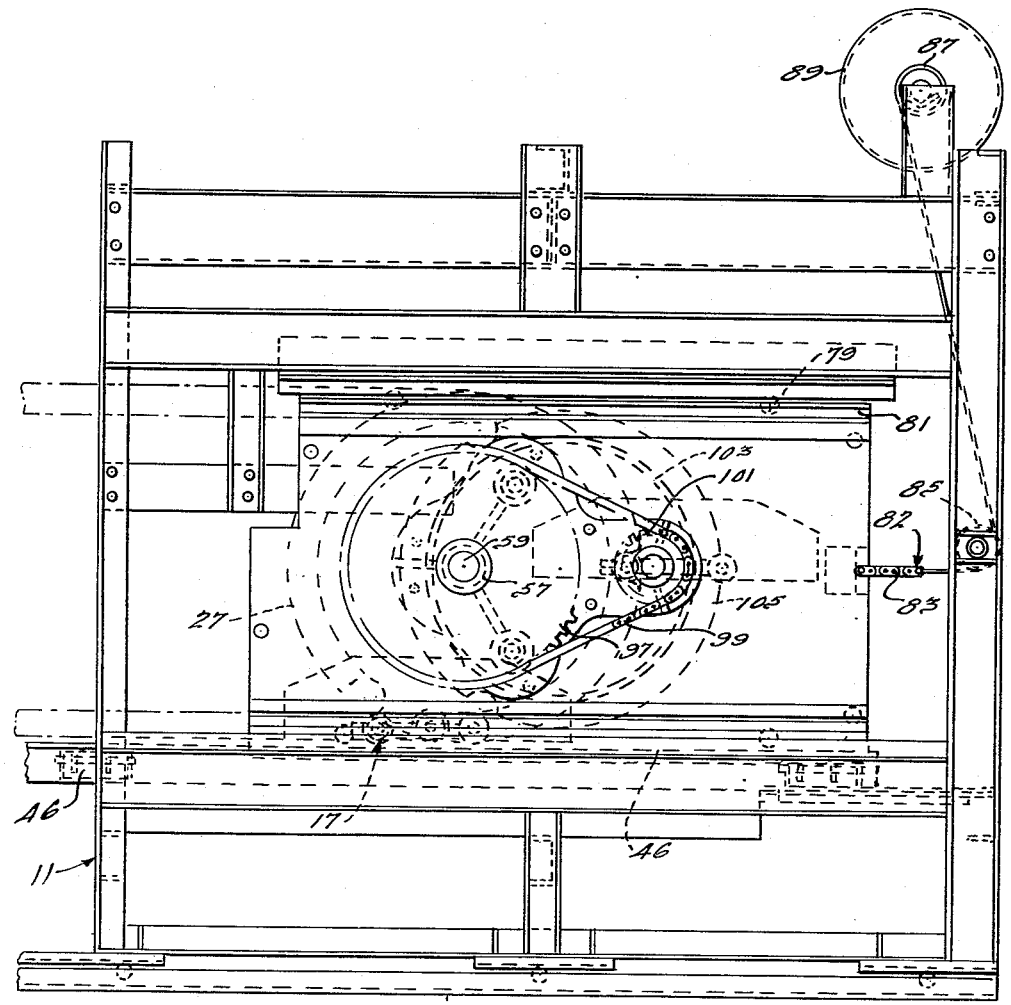

Patented Sept. 14, 1954

2,689,035

UNITED STATES PATENT OFFICE 2,689,035

CONVEYER AND STABILIZING DEVICE

John A. Dersch, Saginaw, Mich., assignor to Baker Perkins Inc., Saginaw, Mich., a corporation of New York Application July 14, 1951, Serial No. 236,777

6 Claims. (Cl. 198—138)

This invention relates generally to a baking oven conveyor system and more particularly to a conveyor system including a stabilizer device for maintaining baking pans or trays in a horizontal plane at all times, and an arrangement or mechanism for automatically dumping or discharging pans with baked goods therein from the conveyor and oven.

In commercial bakeries and the like, large baking ovens are employed for baking bread, rolls, cakes, etc. and such baking ovens generally include a conveyor on which pans filled with dough may be placed. The pans are conveyed through the oven for a predetermined length of time in order to properly bake the dough. While the pans could be placed in the oven at one end of a horizontal conveyor run and removed therefrom adjacent the opposite end of the conveyor run, such an arrangement would generally require a relatively long oven and conveyor and would require the use of at least two people, one to load the pans into the conveyor and one to remove the pans containing the finished baked goods from the conveyor. Therefore, most conveyors for baking ovens include two or more horizontal runs, and while this invention is not limited to any particular number of horizontal runs, the conveyor shown and described herein is of the endless chain type in which chains adjacent opposite sides of the oven extend around guide elements or chain sprockets at each end of the oven so as to provide two courses or upper and lower horizontal runs. In order to prevent the pans, which are positioned on trays connected between the opposed conveyor chains, from spilling or falling therefrom, it is necessary that the pans be retained in a horizontal position even when passing around the sprockets or guide elements at each end of the oven. Furthermore, in order to reduce the number of operators or persons loading and unloading baked goods from the oven, it is desirable to provide a conveyor and oven arrangement in which the pans can be automatically dumped or discharged from the oven and conveyor after the baked goods therein are baked.

In the past many types of stabilizer mechanisms or devices have been devised for retaining the pans in a horizontal plane, even when they are passing around the conveyor guide elements or sprockets, from one horizontal run to the other. One of the most common types of stabilizer arrangements has been the well known third chain type stabilizer in which a chain is connected to the trays through levers to maintain the trays in a horizontal position. With this type of stabilizer, it can be appreciated that a simple automatic dumping arrangement for the pans and finished baked goods is impractical and extremely difficult, if not impossible, to provide. There has been therefore a real need for a conveyor system which includes a simple stabilizer device and means enabling the finished baked goods to be dumped, and so far as is known, no such system or mechanism has been heretofore developed.

It is therefore an object of this invention to provide in a conveyor system a novel baking pan or tray stabilizer mechanism which will maintain the baking pans in a horizontal position at all times and which is so constructed and arranged as not to interfere with an automatic dumping mechanism for discharging the pans with their finished baked goods from the conveyor and oven.

It is a still further object of this invention to provide an arrangement of the aforementioned type in which the pans may be automatically dumped or discharged from the baking oven and conveyor when the baked goods therein are finished, and which dumping arrangement or mechanism may be selectively operated so that if it is not desired to dump the pans and baked goods, as might be the case in the baking of certain types of rolls, cakes, or bread wherein the dumping operation might adversely affect the baked goods, the dumping operation can be eliminated.

It is a still further object of this invention to provide a dumping arrangement or mechanism of the aforementioned type, in which the pans containing baked goods will be dumped or discharged from the oven and conveyor in a direction opposite to the direction of movement of the conveyor so as to eliminate any chance of the pans jamming or otherwise interfering with the conveyor movement.

It is a still further object of this invention to provide a conveyor and stabilizer mechanism of the aforementioned type, in which the stabilizer mechanism is constructed and operated in a manner to insure the proper coordinated action between the stabilizer and the conveyor, so that the pans will be properly conveyed and stabilized at all times.

It is a still further object of this invention to provide mechanism of the aforementioned type which is relatively inexpensive to manufacture and maintain, efficient and durable in construction and simple to operate.

These and other objects of this invention will become apparent from the following detailed description, taken in conjunction with the accompanying drawings, in which:

Fig. 5 is an enlarged sectional view of the structure illustrated in Fig. 3, taken along the line 5—5 thereof and showing the conveyor and dumping mechanism in the non-dumping position;

Fig. 6 is a fragmentary view similar to Fig. 5, illustrating the conveyor and dumping mechanism in the dumping position;

Fig. 7 is a fragmentary end elevational view of one side of the conveyor at the take-up or rear end thereof; and Fig. 8 is a side elevational view of the structure illustrated in Fig. 7, taken in the direction of the arrow 8 thereof.

Figures 1, 2:
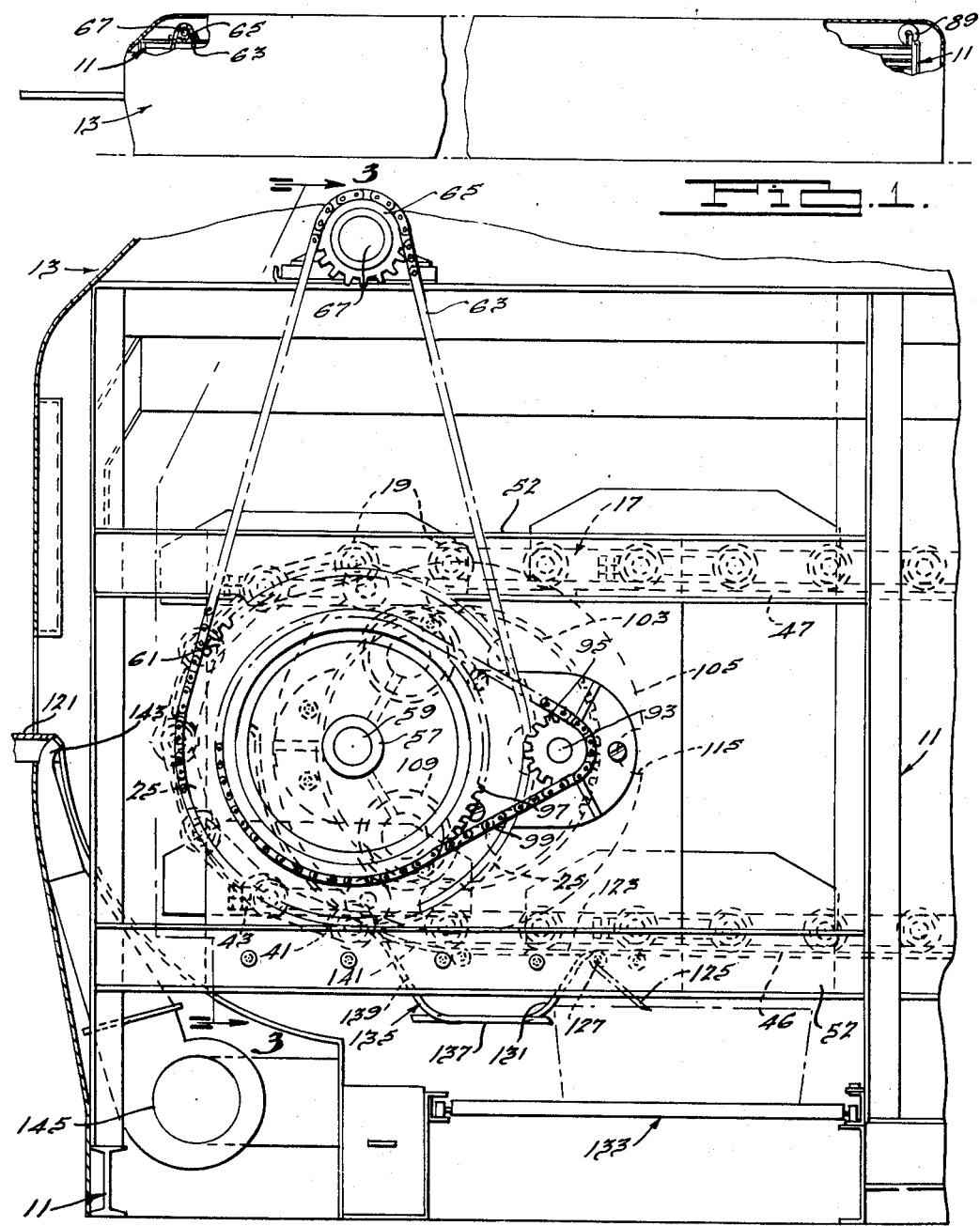
Figure 1 is a side elevational view, with parts broken away, of a baking oven containing the conveyor mechanism of this invention.
Fig. 2 is an enlarged longitudinal sectional view of a portion of the baking oven taken along the line 2—2 of Fig. 3, illustrating the stabilizing and conveyor mechanism adjacent the front end of the oven.
Figure 3:
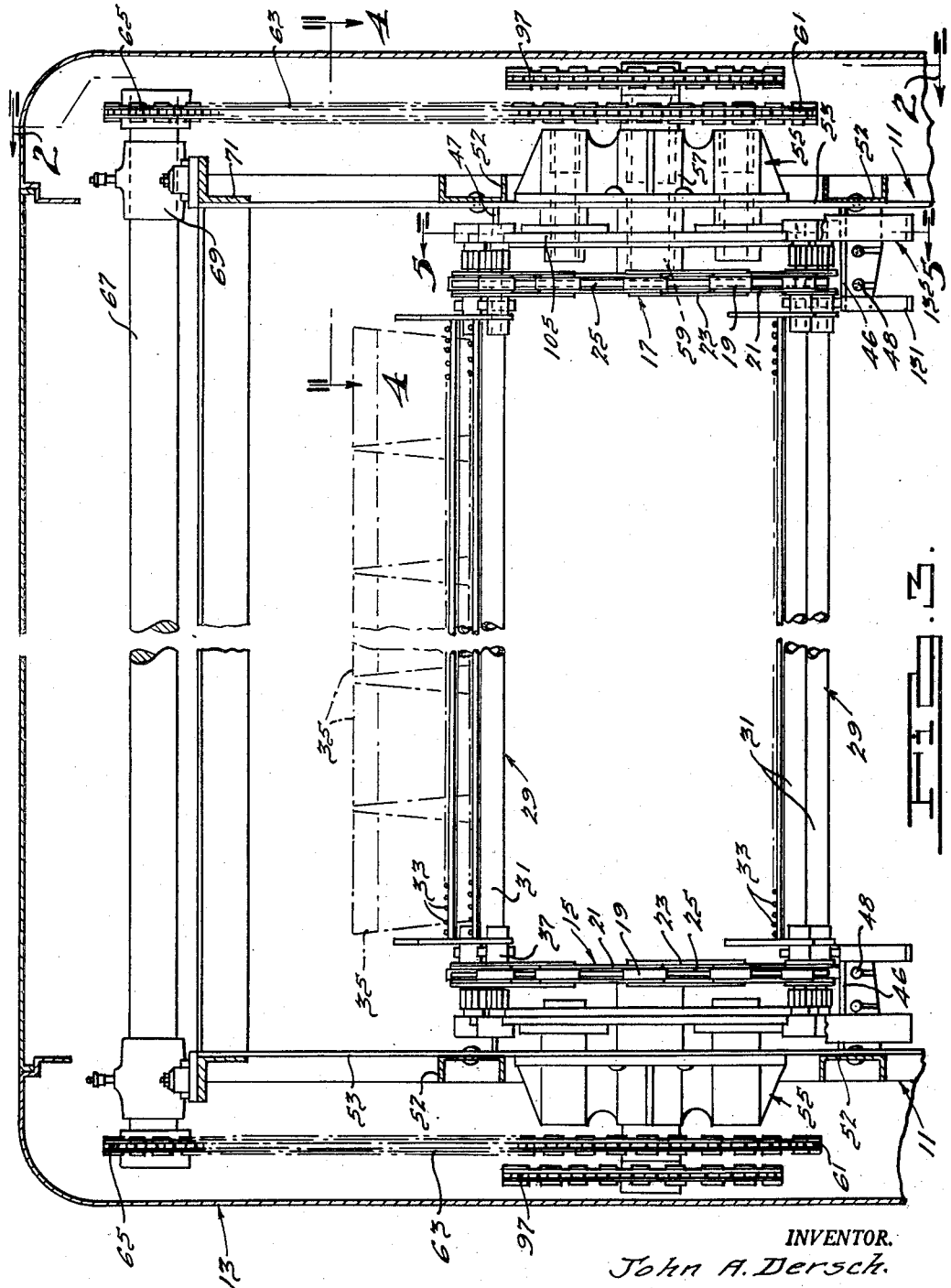
Fig. 3 is a sectional view of the structure illustrated in Fig. 2, taken along the line 3—3 thereof.
Figure 4:
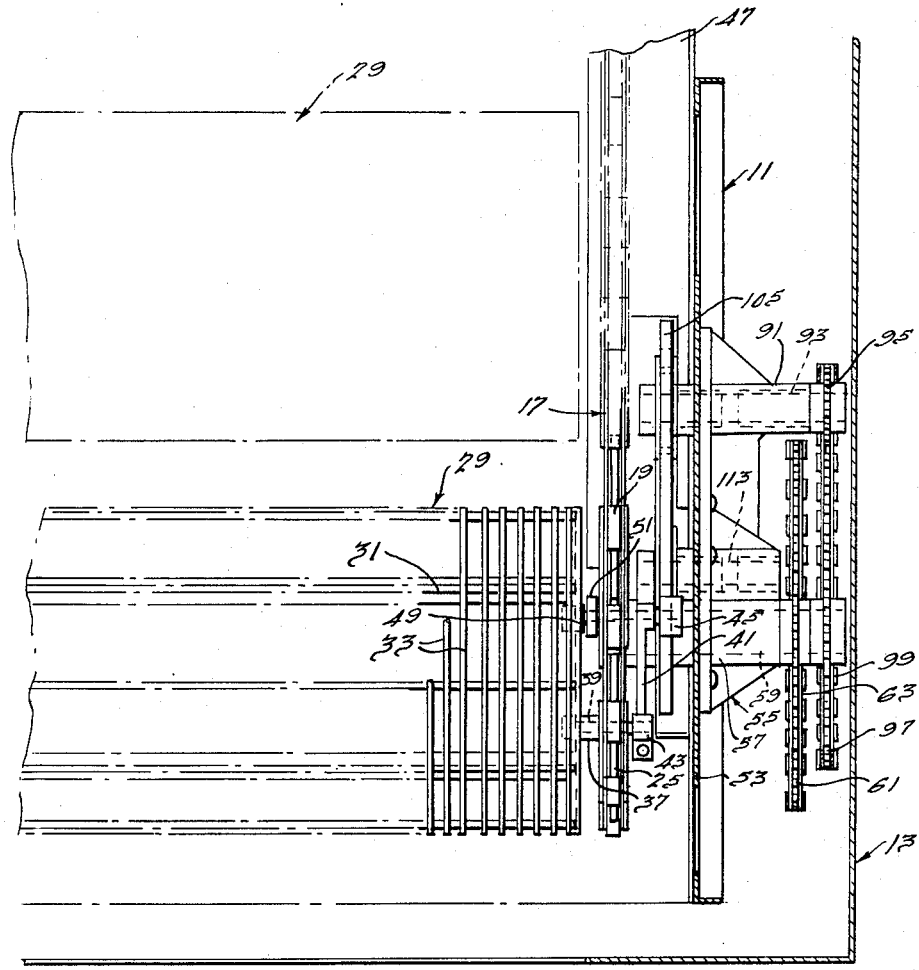
Fig. 4 is an enlarged sectional view of the structure illustrated in Fig. 3, taken along the line 4—4 thereof.

Referring now to the drawings, it will be seen that the baking oven includes a frameworklike supporting structure 11, which is adapted to rest on a floor or the like and which is normally covered or enclosed by a baking oven housing 13. Disposed within the housing 13 are a pair of laterally spaced, endless conveyors 15 and 17 which are substantially identical in construction. The conveyors 15 and 17 may be of any suitable type but are illustrated as being of the chain roller type in which chain rollers 19 are disposed between the adjacent links 21 and 23 thereof, in a generally conventional manner. Each of the conveyor chains 15 and 17 is of the endless type and each extends around a chain sprocket 25 adjacent the front end of the oven, and a similar sprocket 27 adjacent the rear end of the oven, so as to provide upper and lower horizontal runs.

Extending between the laterally spaced conveyor chains 15 and 17, at points spaced throughout the length of the conveyor, are trays 29. The trays 29 may be of various known types, but are illustrated as being of what might be termed the grid type, having laterally extending tubular members 31 and longitudinally extending, laterally spaced rod like members 33. The members 33 constitute the supporting surface of the trays on which one or more pans 35 filled with dough to be baked, may be placed and are supported for movement by the conveyor through the oven. Hub-like bracket members 37 are rigidly connected on the opposite lateral sides of each tray 29, adjacent the forward end thereof. A laterally extending pin or shaft member 39 has one end thereof projecting into each bracket member 37 and rigidly connected therewith by any suitable means. The outer end of each pin or shaft member 39 extends through a roller 19 of its adjacent conveyor chain 15 or 17, so that the trays are connected on opposite sides with the conveyors for movement therewith, and so that the trays can pivot or move about the axis of the pins or shaft members 39, relative to the conveyors and the conveyor rollers 19. One end of a crank member 41 is rigidly connected with each pin or shaft member 39 at 43 by any suitable means. The opposite or rear end of each crank member 41 rotatably supports a crank roller 45, which crank roller is disposed laterally outwardly of its adjacent conveyor chain 15 or 17 and of the point of attachment 43 of its crank arm to its pin or shaft member 39.

A horizontally extending lower track 46 extends through the oven on each side thereof from a point adjacent each front sprocket 25 to a point adjacent each rear sprocket 27. Similar upper horizontal tracks 47 extend longitudinally through the oven on opposite sides thereof from a point adjacent to the front sprockets 25 to a point adjacent the rear sprockets 27. The tracks 46 and 47 are disposed adjacent the upper and lower runs of the conveyor chains and are connected at one end by any suitable means with the stationary framework of the oven structure, with the other ends thereof free to slide, for expansion and contraction, along track bracket pins 48. The tracks furthermore, are disposed in a position to engage and support the chain rollers 19 and the crank arm rollers 45 during the movement of these rollers along their upper and lower horizontal runs, and terminate adjacent the front and rear conveyor sprockets so as not to interfere with the operation of the sprockets or the stabilizer mechanisms disposed adjacent to the sprockets which maintain the trays 29 in their horizontal position as they pass around the sprockets, in a manner which will be hereinafter described.

A hub-like bracket member 49 is connected with each lateral end or side of each tray 29, rearwardly of the bracket members 37, and the members 49 rotatably support rollers 51, which rollers are disposed laterally inwardly of their adjacent chain conveyor 15 or 17 and are referred to hereafter as dump rollers. The rollers 51 do not engage tracks 46 and 47 and so are out of contact with any members except during the dumping operation, as will be brought out hereinafter. Vertically spaced channel members 52 extend longitudinally through the oven housing and are connected with the oven framework in any suitable manner. The channels 52 carry and support side plates 53, which in turn support, on opposite sides of the housing, laterally outwardly of the conveyor chains 15 and 17, drive bearing supporting members or castings 55. Each casting 55 includes a hub or bearing portion 57, in which a shaft 59 is rotatably supported. Each shaft 59 carries on its inner end the conveyor sprockets 25. Each shaft 59 also supports and carries laterally outwardly of casting 55 a drive chain sprocket 61. Each sprocket 61 is connected by a chain 63 with a chain sprocket 65 carried adjacent a lateral outer end of a main drive shaft 67. The drive shaft 67 in turn is rotatably supported adjacent its opposite ends by bearing members 69 which are mounted on frame members 71, forming a part of the stationary framework of the baking oven and conveyor device. The main shaft 67 is connected in any suitable manner to a driving motor (not shown) so that when the motor is operated the shaft 67 will drive each chain sprocket 61 through sprocket 65 and chain 63, and in turn will thus drive each conveyor chain sprocket 25 through shaft 59.

The chain sprockets 25 are formed with a plurality of notches or recesses 75 on the outer periphery thereof. The notches or indentations 75 are, as can be seen in Fig. 5, of a generally semicircular shape so that each of the chain rollers 19 will be successively engaged by one of the notches or recesses 75 to drive the conveyor chains 15 and 17. The notches or recesses 75 are circumferentially spaced so as to properly engage each of the chain rollers 19, in accordance with the spacing of these rollers, and the recesses 75 are shaped so as to properly house or engage the chain rollers so that the same will not inadvertently become disengaged therefrom. It will therefore be appreciated that the conveyor chains 15 and 17 are driven by the sprockets 25 and the main drive shaft 67 in a simple and efficient manner.

The conveyor chain sprockets 27 at the opposite or rear end of the oven are constructed in a manner identical to the chain sprockets 25, so no further description thereof is deemed necessary. The chain sprockets 27 are not connected with the main drive shaft, but are merely rotatably supported in castings 77, which are substantially identical with the castings 55, so as to be driven by the conveyor chains 15 and 17. The castings 77 are adjustably supported on the stationary framework of the oven by ball type bearings 79 which roll in upper and lower bearing races 81, supported on the oven frame work. That is, castings 77 may be adjusted longitudinally, relative to the front castings 55, for the purpose of tightening or loosening the chain conveyors on their sprockets. The position of the castings 77 is controlled and determined by means of a suitable take-up device 82, in the form of chains 83 extending around sprockets 85 and 87 to a sprocket and counterweight type of take-up mechanism 89, rotatably supported on the oven framework.

Each of the castings 55 and 57 is formed with an additional bearing or hub portion 91 which rotatably supports a shaft 93. Carried on the lateral outer end of each shaft 93 is a chain sprocket 95 which is connected with a chain sprocket 97 supported on each shaft 59 laterally outwardly of each of the chain sprockets 61. Each chain sprocket 97 is connected with its adjacent chain sprocket 95 by means of a chain 99 so that when each shaft 59 is driven, each sprocket 95 and shaft 93 will be driven, but due to the differences in the sizes of the sprockets, the sprockets 95 will rotate at a different speed than the conveyor sprockets 25. This ratio may, of course, be varied, but is illustrated as being of the order of four to one. Connected with the lateral inner end of each shaft 93 is a gear 101. Each gear 101 meshes with gear teeth 103 extending around the inner periphery of a stabilizer ring 105. Two flanged idler rollers 109 and 111 are supported by each casting 55 or 57 and together with gear 101 form a three point suspension for each stabilizer ring. The rollers 109 and 111 are rotatably supported on castings 55 and 77 by shafts 113 and cooperate with the dumping pinion gear 101 to rotatably support each stabilizer ring 105. Therefore, as gears 101 are driven they in turn will drive the stabilizer rings 105, which will rotate around their respective gears 101 and rollers 109 and 111 and therefore about an axis disposed centrally of the axes of each gear 101 and its adjacent rollers 109 and 111.

Each stabilizer ring is formed around the outer periphery thereof, with a plurality of recesses 115, which are similar in shape and construction to the recesses 75 in the sprockets 25. The lateral position of the stabilizer rings 105 is such that they will engage the crank rollers 45 on opposite sides of the trays 29, when the rollers leave the ends of their upper or lower track members 46 and 47, or start to move around the conveyor chain sprockets 25 and 27. The recesses 115 on the stabilizer rings are circumferentially spaced in accordance with the spacing of the crank rollers 45 and the trays 29, and in accordance with the ratio of the speed of rotation of the stabilizer rings relative to the conveyor sprockets, so that one recess 115 on each stabilizer ring 105 will properly engage a crank roller 45 on each tray 29 as the same comes into position for engagement thereby. Therefore, as the trays 29 pass around the sprockets 25 and 27 at each end thereof, the sprockets will pick up and engage the chain rollers 19 and the stabilizer rings will pick up and engage the crank rollers 45 on each tray. Whereupon, due to the relative rotative speeds of the stabilizer rings and conveyor sprockets, the positioning of the recesses in the sprockets and stabilizer rings, and the distance between the chain rollers 19 and the crank rollers 45 adjacent thereto, the trays will be held in a horizontal position until they pass around the sprockets 25 or 27 and until the chain rollers and the crank arm rollers again engage the horizontal tracks, upper or lower as the case may be, so that the crank arm rollers and the trays will be retained in a horizontal position at all times. It will, of course, be appreciated that the only thing which prevents the trays from tilting is the engagement of the crank arm rollers 45 either with the upper or lower tracks 46 or 47, or with the stabilizer rings 105. Due to the fact that the crank arm rollers are longitudinally offset relative to the chain rollers to which the crank arms are connected, and due to the fact that the pans 35 are positioned on the trays 29 so that their center of gravity is rearwardly of the pivotal axis of each tray, the crank rollers and crank arms will maintain the trays and thus the pans carried thereby, in a horizontal position throughout their travel path in the horizontal runs and in their travel around the chain sprockets at opposite ends of the conveyor.

In order to reduce the number of operators or people necessary in the operation of the baking oven, means are provided for automatically dumping or discharging the pans 35 with their finished baked goods, from the baking oven. That is, instead of it being necessary for an operator to load pans onto the conveyor through the opening 121 in the front wall of the oven housing, and also unload the pans through the same opening, at the end of the baking operation, discharge or dumping means are provided so that the trays will be empty when they reach a position adjacent the oven opening 121 during their travel around the sprockets 25. Therefore, a single operator need only be employed to load pans onto the conveyor, as the unloading of the pans is automatic. The conveyor chains 15 and 17 travel in a direction such that the upper horizontal runs thereof are moving from the front to the rear of the baking ovens while the lower horizontal runs are moving from the rear to the front thereof. Thus, after the pans are loaded onto the conveyor they move around the upper portion of the sprockets 25 along the upper horizontal run of the conveyor adjacent to the tracks 47, downwardly around the sprockets 27 and back along the lower horizontal runs of the conveyor chains adjacent to the tracks 46.

The tracks 45 adjacent to but just rearwardly of the sprockets 25 are provided with openings 123, which openings are disposed in the track in the path of travel of the crank rollers 45 thereon, but laterally outwardly of the path of travel of the chain rollers 19. A closure plate 125 is provided for each of the track openings 123 and is hingedly supported at 127 so that the closure may be swung between a position in which it closes each opening 123 (Fig. 5) and a position such as shown in Figs. 2 and 5, wherein it uncovers or opens each opening. The closures 125 may be connected with any suitable mechanism which the operator can actuate so as to open or close the closures. Such a mechanism could be of any well known mechanical, electrical or hydraulic type, so that if it is not desired to automatically dump or discharge the pans 35, containing the finished baked goods, from the baking oven, the closures 125 are moved to their closed position so that the crank arm rollers 45 will not drop through the openings 123, but will continue along the track until they are engaged by the stabilizer rings 105, in which event the pans will be removed by hand when they reach a point on the conveyor adjacent the baking oven inlet opening 121. With certain types of baked goods, such as rolls, cakes and some types of breads, it is not desirable to automatically dump or discharge the same, as such an action might have an adverse effect on these baked goods. However, with most types of bread and the like, wherein the pans are completely filled with the baked loaf of bread, it is desirable to automatically dump the same from the baking oven. In such a case, the closures 125 are opened so that as the crank rollers 45 of each tray 29 approach the chain sprockets 25 on the lower horizontal run, they will drop through the track openings 123. If the crank rollers were permitted to fall freely through the openings 123, considerable and sudden torsional loading of the crank arm pins 39 would be occasioned, and such sudden torsional loading or twisting of the pins or shaft members 39 might cause the same to break in time. Therefore, in order to eliminate this possibility and remove any shock or sudden torsional loading of the shaft members 39, means are provided for controlling the rate of dump of the trays 29. This means includes the dump rollers 49 and inclined track or shoe members 131 disposed laterally inwardly of each track opening 123 in a position for engagement by the dump rollers 49 when the crank rollers drop into the track openings 123. Therefore, when the crank rollers 45 drop through the track openings 123 so as to tilt the tray 29 rearwardly, the dump rollers 49 engage and roll along the inclined track or shoe members 131. Thus no shock or sudden torsional loading of the crank arm pin or shaft members 39 will occur and the dumping action will be positively controlled by the inclination of the track or shoe members 131, which inclination may, of course, be varied to control the rate of dumping. As the rate of dumping is controlled by the dumping rollers and the shoe members 131, each tray will be rearwardly tilted about the axis of its pin or shaft members 39 and the pans 35 will slide rearwardly off of the trays and out of the dumping oven. In the illustrated embodiment of this invention an additional conveyor 133 of any suitable type, is provided onto which the pans slide from the trays 29 and the conveyor 133 carries the pans automatically away from the dumping oven.

In order to guide the crank rollers 45 back into position for engagement by the stabilizer rings 105, and in order to return the trays 29 to their normal horizontal position, a shoe 135 is provided below each of the track openings 123. The shoe 135 includes a horizontal portion 137, along which the crank rollers 45 will roll after the dumping operation and an upwardly inclined portion 139 which extends forwardly from the portion 137, and which will raise the crank rollers back to their normal position for engagement by the stabilizer rings 105. A hinged plate 141 is provided in each track 46 above the inclined portion 139 of each shoe member 135, which is swung upwardly and rearwardly by the crank rollers 45 as they move upwardly along the inclined shoe portions 139 toward their normal position. The plates 141 may be biased so as to return to their normal position shown in Fig. 2 after each set of crank rollers has passed therebeyond. When the dumping mechanism is not in use, the hinged plate members 141 remain in their normal closed position and the crank rollers can roll thereover and will be supported thereon, just as if a solid track were employed.

It will thus be seen that a dumping arrangement or mechanism is provided which can be selectively operated to either automatically dump baked goods from the oven and conveyor, or positioned so that the baked goods will not be dumped and will travel along the track with the trays retained in the horizontal position. It will furthermore be appreciated that the stabilizing mechanism of this invention does not interfere with the dumping mechanism or operation, as would normally be the case with third chain type of stabilizer mechanisms, wherein the crank arm would be connected with a third chain. It will furthermore be appreciated that the pans or baked goods are discharged from the conveyor and oven in a rearward direction, or a direction opposite to the direction of movement of the lower horizontal conveyor chain run so that any possibility of jamming of the pans 35 or interference with the conveyor is eliminated.

The baking oven itself may be of any suitable type, employing suitable heating elements, and may include an air curtain 143 adjacent the oven loading opening 121 and blowers 145 for supplying air through the air curtain.

It will thus be appreciated that the structure of this invention positively stabilizes and retains the trays in a horizontal position at all times, except, of course, during the dumping operation, in an extremely simple, efficient and desirable manner. It will also be appreciated that a simple, novel and efficient dumping arrangement and mechanism is provided in conjunction with the conveyor and stabilizer mechanism, and that the stabilizer mechanism will not interfere with or prevent the automatic dumping operation. Therefore, the mechanism and device of this invention aids and produces a superior baking oven and conveyor mechanism than has been heretofore known in the art.

What is claimed is:

1. A conveyor system for a baking oven, including a pair of endless conveyors having horizontal runs, rotary guide elements at the ends of said conveyors over which said conveyors pass, trays disposed between said conveyors, crank arms rigidly connected with opposite sides of each of said trays and pivotally connected with said conveyor, track means extending between said guide elements in position for engagement by one end of each crank arm so as to maintain said trays in a horizontal position, roller means rotatably supported on opposite sides of each of said trays in lateral and longitudinal spaced relationship to each adjacent crank arm, said track means having openings therein adjacent the guide elements at one end of said conveyors and disposed in the path of movement of each crank arm end so that the latter may drop therethrough, whereupon each tray will tilt about its pivotal connection with said conveyors, a track disposed adjacent each of said openings and below the path of movement of said tray roller means, said tracks being engageable by said roller means when said crank arms drop through said openings so as to control the rate of tilting of said trays, and a device rotatably supported adjacent each end of the track means and adjacent said guide elements including spaced means engageable with the end of each crank arm as it passes around said guide elements to retain said crank arms and trays in a horizontal position until the crank arms again engage said track means adjacent said guide elements, and means for driving said devices and said conveyors in timed relation so that said devices will engage said crank arms as aforesaid.

2. A conveyor system for a baking oven, including a pair of spaced apart endless conveyors having horizontal runs, rotary guide elements at the opposite ends of said conveyors over which the same pass, a tray disposed between said conveyors, a crank arm rigidly connected with said tray on each side thereof and pivotally supported on the conveyor adjacent thereto, each of said crank arms including an end portion spaced from the pivotal axis thereof, track means extending between said guide elements and engageable by said crank arm ends to maintain said tray in a horizontal position, said track means having an opening therein disposed in the path of travel of each of said crank arm ends so that said ends can drop into said openings, whereupon said tray will tilt about the pivotal axis of its crank arms, a member connected with said tray on opposite sides thereof in spaced relation to the adjacent crank arm pivotal axis, sloping shoe means disposed in substantial lateral alignment with said track openings and in the path of travel of said tray members so that upon tilting movement of said tray said tray members will engage and move along said shoe means to control the rate of tilting of said tray, a closure for each of said track openings movable between a position to close each of said openings and a position to uncover the same, and selectively operable to determine whether said tray will tilt or remain horizontal in passing over said opening.

3. A conveyor system for a baking oven, including a pair of spaced apart endless conveyors having horizontal runs, rotary guide elements at the opposite ends of said conveyors over which the same pass, a tray disposed between said conveyors, a crank arm rigidly connected with said tray on opposite sides thereof and pivotally supported on the conveyor adjacent thereto, each of said crank arms including an end portion spaced from the pivotal axis thereof, track means extending between said guide elements in position for engagement by said crank arm ends to maintain the tray in a horizontal position, said track means having an opening therein disposed in the path of travel of each of said crank arm ends so that said ends can drop into said openings, whereupon said tray will tilt about the pivotal axis of said crank arms, a member connected with said tray on opposite sides thereof in spaced relation to said crank arm pivotal axis, sloping shoe means disposed in substantial lateral alignment with each of said track openings and in the path of travel of said tray members so that upon tilting movement of said tray said tray members will engage and move along said shoe means to control the rate of tilting of said tray, a closure for each of said track openings movable between a position to close said openings and a position to uncover the same, and selectively operable to determine whether said tray will tilt or remain horizontal in passing over said opening, additional shoe means engageable by each of said crank arm ends after the same has dropped through its said opening and disposed in spaced relation to said first shoe means to raise said crank arms back to their normal track engaging position, a portion of said track means adjacent each of said additional shoe means being supported for pivotal movement relative to said track means and actuatable upon upward movement of said crank arm ends to permit said crank arm ends to pass thereby, said track portions normally closing the space above each of said additional shoe means so as to provide a continuous track except when actuated by said crank arms.

4. A conveyor system for a baking oven, including a pair of spaced apart endless conveyors having horizontal runs, rotary guide elements at the opposite ends of said conveyors over which the same pass, a tray disposed between said conveyors, a crank arm rigidly connected with said tray on opposite sides thereof and pivotally supported on the conveyor adjacent thereto, each of said crank arms including an end portion spaced from the pivotal axis thereof, track means extending between said guide elements in position for engagement by said crank arm ends to maintain the tray in a horizontal position, said track means having an opening therein disposed in the path of travel of each of said crank arm ends so that said ends can drop into said openings, whereupon said tray will tilt about the pivotal axis of said crank arms, a member connected with said tray on opposite sides thereof in spaced relation to said crank arm pivotal axis, sloping shoe means disposed in substantial lateral alignment with each of said track openings and in the path of travel of said tray members so that upon tilting movement of said tray said tray members will engage and move along said shoe means to control the rate of tilting of said tray, a closure for each of said track openings movable between a position to close said openings and a position to uncover the same, and selectively operable to determine whether said tray will tilt or remain horizontal in passing over said opening, additional shoe means engageable by each of said crank arm ends after the same has dropped through its said opening and disposed in spaced relation to said first shoe means to raise said crank arms back to their normal track engaging position, a portion of said track means adjacent each of said additional shoe means being supported for pivotal movement relative to said track means and actuatable upon upward movement of said crank arm ends to permit said crank arm ends to pass thereby, said track portions normally closing the space above each of said additional shoe means so as to provide a continuous track except when actuated by said crank arms, a device rotatably supported adjacent each end of the track means and adjacent said guide elements including spaced means engageable with said crank arm ends as they pass around said guide elements to retain the tray in a horizontal position during such movement, and means for driving said devices and said conveyors in timed relationship so that the spaced means on said devices will engage said crank arm ends as aforesaid.

5. Apparatus for supporting in horizontal relationship trays pivotally secured to opposite portions of a pair of endless conveyors arranged to pass over rotary guide elements at the ends thereof, including members rigidly connected with and extending from opposite sides of each tray, track means extending between and terminating adjacent said guide elements in position for engagement by said members to retain the trays in a horizontal position, a stabilizer ring rotatably supported adjacent each end of the track means and adjacent each of said guide elements, each of said stabilizer rings having a plurality of circumferentially spaced recesses in the outer periphery thereof for engagement with each of the members as they pass around said guide elements to retain said members and their trays in a horizontal position until the members again engage said track means, an internal gear extending around the inner periphery of each of said stabilizer rings, a pinion gear meshing with each of said internal ring gears for rotatably driving the same, additional rotary members engaging each of said ring gears and cooperating with said pinion gear to rotatably support each stabilizer ring, means rotatably supporting each of said pinion gears and said rotary members, and means for driving said pinion gears and said conveyors in timed relationship so that the stabilizer ring recesses will engage said tray members as aforesaid.

6. A conveyor system for a baking oven, including a pair of spaced apart endless conveyor chains having horizontal runs, sprockets at opposite ends of the chains over which the same pass, horizontally extending track means extending between said sprockets, a tray disposed between said chains, crank members connected with and extending from opposite sides of said tray, means pivotally connecting said crank members with said chains, a stabilizer ring rotatably supported adjacent each end of said track means and said sprockets, each of said stabilizer rings including a plurality of circumferentially spaced inwardly extending recesses formed in the outer periphery thereof and engageable with one of said crank members as it passes around said sprockets so as to retain said crank member and its tray in a horizontal position until the crank member again engages said track means, an internal gear extending around the inner periphery of each of said stabilizer rings, a pinion gear meshing with each of said internal ring gears for rotatably driving the same, rotary members engaging each ring gear and cooperating with said pinion gear to rotatably support each stabilizer ring, a member rotatably supporting each of said pinion gears, rotary members and adjacent sprockets, driving means interconnecting each sprocket with its adjacent pinion gear so that rotation of said sprocket will cause rotation of each pinion gear in timed relationship therewith so that the stabilizer ring recesses will engage said crank members as aforesaid.

References Cited in the file of this patent

UNITED STATES PATENTS

| Number | Name | Date |
| --- | --- | --- |
| 1,538,764 | Wald | May 19, 1925 |
| 1,680,441 | Adams | Aug. 14, 1928 |
| 2,195,326 | Crawford et al. | Mar. 26, 1940 |
| 2,414,164 | Nalbach | Jan. 14, 1947 |
| 2,493,857 | Cargill | Jan. 10, 1950 |
| 2,512,356 | Massiello | June 10, 1950 |